United States Patent [19]
Ito et al.

[11] Patent Number: 4,795,785
[45] Date of Patent: Jan. 3, 1989

[54] COATING RESIN COMPOSITION

[75] Inventors: Toshihiko Ito; Masayuki Mogami, both of Ibaraki; Kengo Kobayashi, Hitachi, all of Japan

[73] Assignee: Hitachi Chemical Company, Ltd., Tokyo, Japan

[21] Appl. No.: 937,392

[22] Filed: Dec. 3, 1986

[30] Foreign Application Priority Data

Dec. 3, 1985 [JP] Japan ................. 60-272250

[51] Int. Cl.$^4$ ............... C08F 255/02; C08F 255/00
[52] U.S. Cl. ........................ 525/288; 525/285; 525/286; 525/289; 525/293; 525/296; 525/301; 525/303; 525/304; 525/309; 525/311
[58] Field of Search .................... 525/288, 289

[56] References Cited

U.S. PATENT DOCUMENTS

| | | | |
|---|---|---|---|
| 4,138,390 | 2/1979 | Emmons et al. | 525/289 |
| 4,665,145 | 5/1987 | Yokota et al. | 525/288 |

FOREIGN PATENT DOCUMENTS

| | | | |
|---|---|---|---|
| 0138497 | 12/1978 | Japan | 525/288 |
| 0172911 | 10/1982 | Japan | 525/288 |
| 0129016 | 8/1983 | Japan | 525/288 |
| 0115609 | 6/1985 | Japan | 525/289 |

Primary Examiner—Wilbert J. Briggs, Sr.
Attorney, Agent, or Firm—Antonelli, Terry & Wands

[57] ABSTRACT

A coating resin composition comprising a chlorinated polyolefin-containing polymer obtained by polymerizing a monomer blend containing 0.01 to 5% by weight of an unsaturated organic silane compound in the presence of a chlorinated polyolefin resin having a chlorine content of 50% by weight or less can yield molded articles or coatings excellent in adhesiveness, gloss, resistance to gasoline, resistance to alcohol, or the like.

8 Claims, No Drawings

COATING RESIN COMPOSITION

BACKGROUND OF THE INVENTION

This invention relates to a coating resin composition. Particularly, this invention relates to a coating resin composition which can give a film excellent in properties such as adhesion, gloss or the like without a primer treatment to polyolefins which has not been subjected to any surface treatment for affording printability such as primer treatment, said polyolefins having been formed into molded articles, sheets, films, etc.

Recently, there have been attempted to use synthetic resins such as polyolefins or the like in place of metal for the purpose of weight saving, rust prevention and the like in the field of various industrial fields of automobiles, domestic electric appliances, etc. In this case, coating is generally applied on the surface of a molded article, because the surface of the molded article is required to be in good condition. However, coatings applied on the surface of molded articles made from plastics such as polyolefins, for example polyethylene, polypropylene or the like are generally poor in film performances such as adhesion, gloss, surface appearance or the like. Therefore, there have hitherto been proposed many attempts in order to improve the film performances such as adhesion of the coating to a molded article made from plastics such as polyolefins or the like, gloss, surface appearance or the like. For instance, one of the methods for improving adhesion is to subject the surface of the molded article to surface treatment such as degreasing treatment, chromic acid treatment, etc. There is also a method in which the surface of the molded article is subjected to primer treatment by coating a chlorinated polyolefin or a polyolefin modified with maleic acid or anhydride thereof in a solution or a dispersion and a paint excellent in film performance is applied thereto (refer to, e.g. Japanese Patent Application Kokai (Laid-Open) Nos. 83042/83, 118809/83, 30830/84, etc.).

Furthermore, there have been proposed as paint compositions for improving the adhesion of films applied to polyolefin molded articles, epoxy compositions comprising a polyolefin or an ethylene copolymer which has functional groups reactive with an epoxy group, a hardner for an epoxy resin, and an epoxy resin (e.g. Japanese Patent Application Kokai (Laid-Open) Nos. 72053/81, 50971/81, 101122/83, etc.). There have also been proposed a urethane composition comprising an acrylic resin which has functional groups reactive with an isocyanate group, a chlorinated polyolefin and an isocyanate compound, and a urethane composition comprising an acrylic resin modified with a chlorinated polyolefin which resin has functional groups reactive with an isocyanate group and an isocyanate compound (e.g. Japanese Patent Publication No. 14767/82, Japanese Patent Application Kokai (Laid-Open) Nos. 17174/83, 27968/84, etc.). Moreover, there have been proposed chlorinated polyolefin resin compositions modified with an acrylate which comprise an acrylic resin and a chlorinated polyolefin (e.g. Japanese Patent Application Kokai Nos. 183718/83, 194959/83, 30830/84, etc.).

However, the methods of surface treatment mentioned above are often insufficient to improve film performances such as adhesion or the like. In the aforementioned method by primer treatment, a film excellent in adhesion is often obtained depending on the kinds of chlorinated polyolefins and modified polyolefins, although the method has defects that the handling operation for coating the primer is compricated and needs much time and effort for the primer treatment, thus leading to an increase of cost for coating. Moreover, it is difficult to say that the aforementioned epoxy compositions and urethane compositions are sufficient in adhesion to plastic molded articles made from, e.g. polyolefins or the like. These compositions are of a double-liquid type and thus need time for blending. They are of a curing type and thus have defects in that they should be considered for their workability such as pot life or the like.

The adhesion of the aforementioned chlorinated polyolefin composition modified with acrylates is influenced by the content of the chlorinated polyolefin. Thus, the composition tends to decrease their performances such as the surface appearance, gloss or the like, even if sufficient adhesion is afforded to the composition by increasing the content of the chlorinated polyolefin. Thus, the composition also has a defect in that it is difficult to modify simultaneously adhesion, surface appearance and gloss.

SUMMARY OF THE INVENTION

It is an object of this invention to provide a resin composition which will solve the aforementioned defects and may produce a coat which can directly be applied to the surface of a molded article without surface treatment and is excellent in properties such as adhesiveness, gloss, resistance to gasoline, resistance to alcohol or the like.

This invention provides a coating resin composition comprising a chlorinated polyolefin-containing polymer obtained by polymerizing, in the presence of 0.5–15% by weight of a chlorinated polyolefin resin having a chlorine content of 50% by weight or less, 99.5–85% by weight of a polymerizable monomer blend containing 0.01–5% by weight of an unsaturated organic silane compound represented by the formula:

wherein X is a group having a copolymerizable double bond; Y is a hydrolyzable group; R is an inert monovalent organic group; n is an integer of 1 to 3; m is zero or an integer of 1 or 2; and m+n is 3.

DESCRIPTION OF THE PREFERRED EMBODIMENTS

The chlorinated polyolefin resins mentioned above include polyethylene resins, polypropylene resins, ethylene-propylene copolymers, ethylene-vinyl acetate copolymers and the like, all of which have a chlorine content of 50% by weight or less. If the chlorine content exceeds 50% by weight, adhesion to polyolefin base materials decreases. Therefore, the content of chlorine should be determined in consideration of various film performances and is preferably in the range of 15–35% by weight.

The above-mentioned polymerizable monomer blend contains an unsaturated organic silane compound represented by the formula (I):

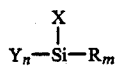

in a proportion of 0.01–5% by weight. The adhesion of the film as well as the gloss and hardness of the film can be improved by using the unsaturated organic silane compound. If the content of the unsaturated organic silane compound is less than 0.01% by weight, the effect of the improvement is little. If the content of the silane compound exceeds 5% by weight, the hydrolyzable group is hydrolyzed and crosslinked during polymerization and thus the compound tends to form a gel. The unsaturated organic silane compound is preferably used in a proportion of 0.1–2% by weight to the aforementioned polymerizable monomer blend.

In the formula (I), X is a group having a copolymerizable double bond and includes, for example, alkenyl groups such as vinyl, allyl, butenyl or the like; cycloalkenyl groups such as cyclohexenyl, cyclopentadienyl, cyclohexadienyl or the like; unsaturated acyloxyalkyl groups such as γ-methacryloxypropyl or the like; unsaturated acyloxyalkoxy groups such as γ-methacryloxyethylpropyl ether or the like; $CH_2=C(CH_3)COO(CH_2)_2OCH_2CH-(OH)C-H_2O(CH_2)_3-$ or the like. Among them, more preferred ones are unsaturated acyloxyalkyl groups such as γ-methacryloxypropyl or the like or unsaturated acyloxyalkoxy groups such as γ-methacryloxyethylpropyl ether or the like. The hydrolyzable group in the definition of Y preferably includes chlorine, an alkoxy group having 1-6 carbon atoms, an acyloxy group having 1-6 carbon atoms, an oximo group having 1-14 carbon atoms and the like and typically includes groups which produce a hydroxyl group upon hydrolysis, for example, alkoxy groups such as methoxy, ethoxy or butoxy; acyloxy groups such as formyloxy, acetoxy or propyleneoxy; or oximo groups such as $-ON=C(CH_3)_2$, $-ON=C(CH_3)C_2H_5$ or $-ON=C(C_6H_5)_2$; or alkylamino or arylamino groups such as $-NHCH_3$, $-NHC_2H_5$ or $-NH(C_6H_5)$. The group Y may be the same or different when n is 2 or 3. The group R is an inactive monovalent organic group, preferably a hydrocarbon group having 1-18 carbon atoms and includes, for example, alkyl groups such as methyl, ethyl, propyl, butyl, tetradecyl or octadecyl; aryl groups such as phenyl, benzyl, tolyl or the like; aralkyl groups, alkaryl groups or the like.

As the unsaturated organic silane compound represented by the formula (I), there can be used, for example, vinyltrimethoxysilane, vinyltriethoxysilane, vinyltri(2-methoxyethoxy)silane, vinylmethyldimethoxysilane, vinylmethyldiethoxysilane, γ-methacryloxypropyltrimethoxysilane, γ-methacryloxypropyltri(2-methoxyethoxy)silane, γ-acryloxypropyltriethoxysilane, vinyltrichlorosilane, γ-methacryloxylaurylpropoxydimethoxysilane, γ-methacryloxyhexyltriethoxysilane, vinyldimethylmethoxysilane, γ-methacryloxymethyltrimethoxysilane, γ-acryloxyethylmethoxyethoxybutoxysilane, γ-acryloxyoctylbutoxymethoxysilane, γ-acryloxybutylmethoxydibutoxysilane, etc, alone or as a mixture thereof.

The group Y in the unsaturated organic silane compound represented by the formula (I) seems to react with moisture in raw materials used or a solvent for polymerization to form a hydroxyl group or a group having a hydroxyl group by hydrolysis or substitution reaction. The functional groups such as the hydroxyl groups thus produced seem to be crosslinked each other during polymerization and/or drying of the paint.

As the polymerizable monomer incorporated into the aforementioned polymerizable monomer blend, there can be used, in addition to the unsaturated organic silane compound represented by the formula (I), a monomer represented by the formula:

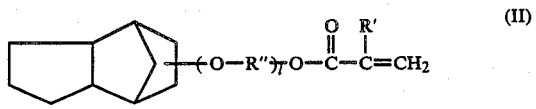

wherein R' is hydrogen or a lower alkyl group; R" is a divalent organic group; and L means a repetition number of (O - R") and is 0 or 1; alkyl acrylates such as methyl acrylate, ethyl acrylate, butyl acrylate, isobutyl acrylate, 2-ethylhexyl acrylate, lauryl acrylate, cyclohexyl acrylate or the like; alkyl methacrylates such as methyl methacrylate, ethyl methacrylate, butyl methacrylate, isobutyl methacrylate, 2-ethylhexyl methacrylate, lauryl methacrylate, cyclohexyl methacrylate or the like; hydroxyalkyl methacrylates such as 2-hydroxyethyl methacrylate, hydroxypropyl methacrylate or the like; hydroxyalkyl acrylates such as 2-hydroxyethyl acrylate, 2-hydroxypropyl acrylate or the like; aminoalkyl methacrylates such as aminomethyl methacrylate, N-methylaminomethyl methacrylate, N,N-diethylaminoethyl methacrylate or the like; aminoalkyl acrylates such as aminomethyl acrylate, N-methylaminomethyl acrylate, N,N-diethylaminoethyl acrylate or the like; glycidyl methacrylate, glycidyl acrylate, methacrylic acid, acrylic acid, methacrylamide, acrylamide; styrene type monomers such as styrene, vinyltoluene, α-methylstyrene or the like; vinyl derivatives such as vinyl chloride, vinylidene chloride, vinyl acetate, isopropenyl acetate or the like; unsaturated dibasic acids such as maleic acid, fumaric acid or the like or anhydrides thereof, monoesters thereof such as monomethyl esters, monoethyl esters or the like or diesters thereof such as dimethyl esters, diethyl esters or the like. The term "alkyl" mentioned above includes "cycloalkyl".

In the formula (II), the numbering of the carbon atoms in the tricyclodecyl group can be done as shown below:

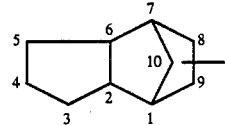

Thus, the group of the formula:

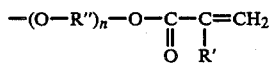

is bonded to 8 or 9 position. R" is a divalent organic group having 1-18 carbon atoms, preferably 2-12 carbon atoms, that is, an alkylene group or a group represented by the formula; $-(Z-O)_m-Z'-$, wherein Z and Z' may be the same or different and represent independently an alkylene group having 2 or more carbon atoms; and m means the repetition number of $-(Z-O)-$ and is an integar of 1 or more.

As the monomer represented by the aforementioned formula (II), there can be used tricyclodecyloxyalkyl acrylates or methacrylates such as tricyclodecyl acrylate, tricyclodecyl methacrylate, tricyclodecyloxyethyl acrylate, tricyclodecyloxyethyl methacrylate, tricyclodecyloxypropyl acrylate, tricyclodecyloxypropyl methacrylate or the like; and polyalkylene glycol tricyclodecyl monoether acrylates or methacrylates such as diethylene glycol tricyclodecyl monoether acrylate or methacrylate or the like.

As the polymerizable monomer incorporated into the aforementioned polymerizable monomer blend, it is preferable to use as an essential formulation ingredient at least one of the compounds selected from the group consisting of the monomers represented by the above-mentioned formula (II), alkyl acrylates and alkyl methacrylates. In this case, the above-mentioned polymerizable monomer blend preferably comprises:

(a) 0.01–5% by weight of the unsaturated organic silane compound represented by the formula (I),
(b) 10–99.99% by weight of at least one monomer selected from the group consisting of the monomers represented by the formula (II), alkyl acrylates and alkyl methacrylates, and
(c) 0–89.99% by weight of at least one other polymerizable monomer, the total being 100% by weight. In this case, it is preferred to use the aforementioned ingredient (b) for providing good adhesion, gloss and resistance to alcohol of the film.

Another preferable formulations of the abovementioned polymerizable monomer blend are illustrated below.

A formulation of the aforementioned polymerizable monomer blend comprising:
(a') 0.01–5% by weight of the unsaturated organic silane compound represented by the formula (I),
(b') 10–99.99% by weight of the monomer represented by the formula (II), and
(c') 0–89.99% by weight of at least one other polymerizable monomer (inclusive of alkyl acrylates and alkyl methacrylates), the total being 100% by weight. In this case, the adhesion, gloss and resistance to alcohol of the film can be satisfactorily improved by the use of the aforementioned ingredient (b').

A formulation of the aforementioned polymerizable monomer blend comprising:
(a") 0.01–5% by weight of the unsaturated organic silane compound represented by the formula (I),
(b") 50–95% by weight of alkyl acrylates and/or alkyl methacrylates, and
(c") 0–49.99% by weight of at least one other polymerizable monomer (inclusive of the monomers represented by the formula (II)), the total being 100% by weight. In this case, it is preferred to use the aforementioned ingredient (b") for providing good adhesion, gloss and resistance to alcohol of the film.

To the aforementioned polymerizable monomer blend, there can be incorporated in a small amount as a polymerizable monomer a monomer having 2 or more polymerizable double bonds such as divinylbenzene, ethylene glycol dimethacrylate, ethylene glycol diacrylate, diethylene glycol dimethacrylate, diethylene glycol diacrylate, polyethylene glycol dimethacrylate, polyethylene glycol diacrylate, trimethylolpropane trimethacrylate, trimethylolpropane triacrylate, pentaerythritol trimethacrylate, pentaerythritol triacrylate, pentaerythritol tetramethacrylate, pentaerythritol tetraacrylate or the like; polyvinylalcohol di-, tri-, tetra- or penta-acrylate or methacrylate. These monomers can preferably be used in an amount of 1% by weight or less based on the polymerizable monomer blend. If these are present in an excessive amount, the blend tends to form a gel during polymerization.

Further, in the aforementioned polymerizable monomer blend, the polymerizable monomers having functional groups such as hydroxyl, glycidyl, carboxyl, amino or the like are preferably used in the range of 0–5% by weight. If these monomers are present in excessive amounts, adhesiveness to polyolefin tends to decrease. However, the polymerizable monomer having hydroxyl groups may be used in such an amount that satisfactory reactivity is afforded, for instance, the hydroxyl group in the aforementioned chlorinated polyolefin containing polymer be in a number of 5–100, when it is used in combination with a hardner which is reactive to the hydroxyl groups of an amino resin such as melamine resin, benzoguanamine resin, urea resin or the like, or alkyl ethers such as methyl ether or butyl ether thereof.

According to this invention, the aforementioned chlorinated polyolefin and the aforementioned polymerizable monomer blend are formulated in a weight ratio of the former/latter between 0.5/99.5–15/85. If the weight ratio exceeds 15/85, resistance to solvent and hardness decrease. If the weight ratio is less than 0.5/99.5, adhesiveness to the polyolefin base material decreases. The weight ratio is preferably in the range of 1/99–10/90.

The polymerization of the aforementioned polymerizable monomer blend in the presence of the abovementioned chlorinated polyolefin is carried out by a conventional radical polymerization method. For instance, the blend is polymerized by a solution polymerization method at 60°–130° C. In this case, there can be used as the organic solvent an aromatic solvent such as toluene, xylene or the like; a ketone solvent such as methyl ethyl ketone, methyl isobutyl ketone or the like; an ester solvent such as ethyl acetate, butyl acetate or the like; or a chlorine solvent such as carbon tetrachloride or the like. When polymerization is conducted, there can be used as a polymerization initiator an organic peroxide such as benzoyl peroxide, dicumyl peroxide, dibutyl peroxide or the like; or an azobis compound such as azobisisobutyronitrile, azobisvaleronitrile or the like. The aforementioned polymerizable monomer blend is preferably used after the monomers to be blended have preliminarily been blended, although the monomers may be individually incorporated on polymerization or the blend may be added portionwise.

The chlorinated polyolefin-containing polymer thus obtained is dissolved in an appropriate solvent to form a coating resin composition. As the solvent, there can be used a solvent illustrated as the solvent for the above-mentioned solution polymerization. Thus, when the chlorinated polyolefin-containing polymer is synthsized by solution polymerization, the coating resin composition can be obtained at the same time as the completion of the polymerization.

Further, the composition according to this invention can contain inorganic pigments such as titanium white, cadmium yellow, carbon black and the like; organic pigments such as phthalocyanines, azo compounds and the like and other additives. A hardner can also be incorporated therein, if necessary.

The coating resin composition according to this invention can be applied by methods such as spray coating, roll coating or the like. The amount of the organic solvent is appropriately determined so that the solid content be suitable for respective coating methods. When the composition is applied by spray coating, it is preferably prepared to adjust the viscosity in the range of 12-20 seconds measured by Ford cup #4 at 25° C.

The composition thus obtained according to this invention can be used as a top coat, an enamel paint, a primer or the like on polyolefin materials such as polyolefine molded articles, sheets or films.

This invention is explained below referring to Examples, wherein all parts and percentages are by weight, unless otherwise specified.

EXAMPLES 1-5 AND COMPARATIVE EXAMPLES 1-4

To a reactor equipped with a stirrer and a condensor were charged a toluene solution having 15% solid content of chlorinated polypropylene (chlorine content: 26%) which had a solid content shown in Table 1 and a toluene solution having 20% solid content of chlorinated polyethylene (chlorine content: 26%) which had a solid content shown in Table 1 so that total amount of the two solution reached 50 parts by weight. The mixture was heated up to 100° C., and a mixture in which a monomer having a formulation ratio illustrated in Table 1 and 1 part of benzoyl peroxide were homogeneously dissolved was added dropwise over a period of 3 hours. The mixture was reacted for 5 hours at the same temperature. After cooling, toluene was added so that the solid content be ca. 41-42%. Then, the mixed solvent of toluene/butyl Cellosolve (95/5, by weight) was added to adjust, the viscosity measured by Ford cup #4 between 12-13 seconds. Subsequently, the coating resin composition thus obtained is spray coated on a polypropylene molded plate which is not subjected to any surface treatment, and the plate was heated at 60° C. for 30 minutes and then left standing at room temperature for 24 hours. Thickness of the coating film was adjusted to 30 μm. Using the coated molded plate thus obtained, adhesion, hardness, gloss, resistance to gasoline and resistance to alcohol were tested.

The test methods employed were shown in the following:

Adhesiveness: Cross-cut cellophase tape test method in accordance with JIS K 5400.

Gloss: Measured with a reflectivity on a mirror at an angle of 60°.

Resistance to alcohol and resistance to gasoline: Measured with 1 kg of a load by a rubbing test, and the results were graded as follows depending on the number of rubbing until a coated film disappeared:

⊚: 150 or more, ○: 100-149, X: 99 or less. The results are shown in Table 1.

TABLE 1

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Formulation (part) | | | | | | | | | |
| Chlorinated polypropylene (Cl cont.: 26%) [solid content] | 5 | 5 | 5 | 5 | 2.5 | 5 | 0 | 19 | 5 |
| Chlorinated polyethylene (Cl cont.: 26 %) [solid ingredient] | 0 | 0 | 0 | 0 | 2.5 | 0 | 0 | 0 | 0 |
| Monomer | | | | | | | | | |
| γ-Methacryloxypropyltrimethoxysilane | 0.5 | 0.5 | 0.75 | 0.75 | 0.75 | 0 | 0.5 | 0.5 | 0 |
| Methyl methacrylate | 94.5 | 60 | 94 | 60 | 60 | 95 | 99.5 | 80.5 | 60 |
| Isobutyl methacrylate | 0 | 34.5 | 0 | 34 | 34 | 0 | 0 | 0 | 35 |
| Trimethylolpropane triacrylate | 0 | 0 | 0.25 | 0.25 | 0.25 | 0 | 0 | 0 | 0 |
| Properties | | | | | | | | | |
| Adhesiveness | 100/100 | 100/100 | 100/100 | 100/100 | 100/100 | 50/100 | 0/100 | 100/100 | 70/100 |
| Gloss (%: reflectivity) | 87 | 84 | 87 | 85 | 85 | 45 | 88 | 70 | 55 |
| Pencil hardness | H | F | H | H | H | F | H | HB | F |
| Resistance to alcohol | ○ | ⊚ | ○ | ⊚ | ⊚ | ○ | ⊚ | X | ○ |
| Resistance to gasoline | ⊚ | ○ | ⊚ | ○ | ○ | ○ | ⊚ | ○ | X |

EXAMPLES 6-13

The tests were conducted in the same manner as in Examples 1-5 with the formulations shown in Table 2. The results are shown in Table 2.

TABLE 2

|  | Example | | | | | | | |
| --- | --- | --- | --- | --- | --- | --- | --- | --- |
|  | 6 | 7 | 8 | 9 | 10 | 11 | 12 | 13 |
| Formulation (part) | | | | | | | | |
| Chlorinated polypropylene (Solid content) | 5 | 5 | 5 | 5 | 5 | 5 | 5 | 5 |
| Monomer | | | | | | | | |

TABLE 2-continued

| | Example | | | | | | | |
|---|---|---|---|---|---|---|---|---|
| | 6 | 7 | 8 | 9 | 10 | 11 | 12 | 13 |
| γ-Methacryloxy-propytrimethoxy-silane | 0.5 | 0.75 | — | 0.75 | — | 0.4 | 0.75 | 0.5 |
| Vinyltrimethoxy-silane | — | — | 0.75 | — | 0.75 | 0.35 | — | — |
| Tricyclodecyl methacrylate | 25 | 25 | 25 | 25 | 25 | 25 | 84 | 25* |
| Isobutyl methacrylate | 12 | — | — | — | — | — | — | 12 |
| Methacrylic acid | 2.5 | — | — | — | — | — | — | 2.5 |
| Methyl methacrylate | 55 | 69 | 69 | 69 | 69 | 69 | — | 55 |
| Trimethylol-propane triacrylate | — | 0.25 | 0.25 | — | — | 0.15 | 0.25 | — |
| Pentaerythritol tetramethacrylate | — | — | — | 0.25 | 0.25 | 0.1 | — | — |
| Properties | | | | | | | | |
| Adhesiveness | 100/100 | 100/100 | 100/100 | 100/100 | 100/100 | 100/100 | 100/100 | 100/100 |
| Gloss (%, reflectivity) | 85 | 85 | 82 | 84 | 85 | 85 | 95 | 85 |
| Pencil hardness | HB-F | H | H | H | H | H | H | HB |
| Resistance to gasoline | ◉ | ◉ | ◉ | ◉ | ◉ | ◉ | ○ | ◉ |
| Resistance to alcohol | ◉ | ◉ | ◉ | ◉ | ◉ | ◉ | ◉ | ○ |

Note to Table 2:
*Methacrylate of diethylene glycol tricyclodecyl monoether was used in place of tricyclodecyl methacrylate.

As explained above, the coating resin composition according to this invention is excellent in adhesion to plastic such as untreated polyolefin or the like, gloss, resistance to alcohol and resistance to gasoline.

What is claimed is:

1. A coating resin composition comprising a chlorinated olefin polymer obtained by polymerizing, in the presence of 0.5–15% by weight of a chlorinated olefin polymer resin having a chlorine content of 50% by weight or less, 99.5–85% by weight of a polymerizable monomer blend containing (a) 0.01–5% by weight of an unsaturated organic silane compound represented by the formula:

wherein X is a group having a copolymerizable double bond; Y is a hydrolyzable group; R is an inert monovalent organic group; n is an integer of 1–3; m is zero or an integer of 1 or 2; and m+n is 3;

(b) 10–99.99% by weight of at least one monomer selected from the group consisting of monomers represented by the formula:

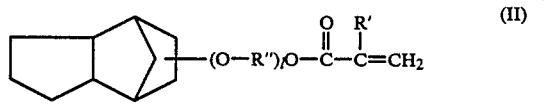

wherein R' is hydrogen or a lower alkyl group; R" is a divalent organic group; and l means a repetition number of (O—R") and is 0 or 1; alkyl acrylates and alkyl methacrylates; and (c) 0–89.99% by weight of at least one other polymerizable monomer, the total being 100% by weight.

2. A coating resin composition according to claim 1, wherein the polymerizable monomer blend comprises:

(a') 0.01–5% by weight of the unsaturated organic silane compound represented by the formula (I),
(b') 10–99.99% by weight of the monomer represented by the formula (II), and
(c') 0–89.99% by weight of the at least one other polymerizable monomer, the total being 100% by weight.

3. A coating resin composition according to claim 1, wherein the polymerizable monomer blend comprises:

(a") 0.01–5% by weight of the unsaturated organic silane compound represented by the formula (I),
(b") 50–95% by weight of the at east one member selected from the group consisting of alkyl acrylates and alkyl methacrylates, and
(c") 0–49.99% by weight of at least one other polymerizable monomer, the total being 100% by weight.

4. A coating resin composition according to claim 1, wherein the unsaturated organic silane compound of the formula (I) is vinyltrimethoxysilane, vinyltriethoxysilane, vinyltri(2-methoxyethoxy)silane, vinylmethyldimethoxysilane, vinylmethyldiethoxysilane, γ-methacryloxypropyltrimethoxysilane, γ-methacryloxypropyltri(2-methoxyethoxy)silane, γ-acryloxypropyltriethoxysilane, vinyltrichlorosilane, γ-methacryloxylaurylpropoxydimethoxysilane, γ-methacryloxyhexyltriethoxysilane, vinyldimethylmethoxysilane, γ-methacryloxymethyltrimethoxysilane, γ-acryloxyethylmethoxyethoxybutoxysilane, γ-acryloxyoctylbutoxymethoxysilane, γ-acryloxybutylmethoxydibutoxysilane, alone or as a mixture thereof.

5. A coating resin composition according to claim 1, wherein the monomer of the formula (II) is tricyclodecyl acrylate, tricyclodecyl methacrylate, tricyclodecyloxyethyl acrylate, tricyclodecyloxyethyl methacrylate, tricyclodecyloxypropyl acrylate, tricyclodecyloxypropyl methacrylate, diethylene glycol tricyclodecyl monoether acrylate or diethylene glycol tricyclodecyl monoether methacrylate.

6. A coating resin composition according to claim 1, wherein the chlorinated olefin polymer resin has a chlorine content of 15-35% by weight.

7. A coating resin composition according to claim 1, wherein the polymerizable monomer blend contains 0.1 to 2% by weight of the unsaturated organic silane compound.

8. A coating composition according to claim 1, wherein the at least one other polymerizable monomer is a monomer other than component (b) and is selected from the group consisting of alkyl acrylates, alkyl methacrylates, hydroxyalkyl acrylates, hydroxyalkyl methacrylates, aminoalkyl acrylates, aminoalkyl methacrylates, glycidyl acrylate, glycidyl methacrylate, acrylic acid, methacrylic acid, acrylamide, methacrylamide, styrene vinyl tolune, α-methylstyrene monomers, vinyl chloride, vinylidene chloride, vinyl acetate, isopropenyl acetate, and unsaturated dibasic acids, anhydrides of unsaturated dibasic acids, monoesters of unsaturated dibasic acids and diesters of unsaturated dibasic acids.

* * * * *